(12) United States Patent
Rudi et al.

(10) Patent No.: US 8,087,432 B2
(45) Date of Patent: Jan. 3, 2012

(54) FLEXIBLE HEAT-INSULATED CONDUIT AND METHOD OF MAKING SAME

(75) Inventors: Roberto Rudi, Schinznach-Dorf (CH); Christian Dambowy, Gebenstorf (CH)

(73) Assignee: Brugg Rohr AG, Holding, Brugg (CH)

( * ) Notice: Subject to any disclaimer, the term of this patent is extended or adjusted under 35 U.S.C. 154(b) by 933 days.

(21) Appl. No.: 12/079,465

(22) Filed: Mar. 26, 2008

(65) Prior Publication Data

US 2008/0236697 A1   Oct. 2, 2008

(30) Foreign Application Priority Data

Mar. 31, 2007   (DE) .................. 10 2007 015 660

(51) Int. Cl.
*F16L 9/14*   (2006.01)

(52) U.S. Cl. ........ 138/149; 138/114; 138/148; 428/36.5; 521/56

(58) Field of Classification Search .................. 138/149, 138/112–114, 148; 428/36.5; 521/56
See application file for complete search history.

(56) References Cited

U.S. PATENT DOCUMENTS

| | | | | |
|---|---|---|---|---|
| 5,871,034 A * | 2/1999 | Sumner | | 138/149 |
| 6,058,979 A * | 5/2000 | Watkins | | 138/149 |
| 6,092,557 A * | 7/2000 | Sumner | | 138/149 |
| 6,116,290 A * | 9/2000 | Ohrn et al. | | 138/149 |
| 6,166,109 A * | 12/2000 | Spitler et al. | | 523/218 |
| 6,182,705 B1 * | 2/2001 | Sumner | | 138/140 |
| 2002/0066491 A1* | 6/2002 | Lively | | 138/149 |
| 2004/0176486 A1* | 9/2004 | Glorioso et al. | | 521/56 |
| 2005/0079352 A1* | 4/2005 | Glorioso et al. | | 428/402.21 |
| 2010/0043906 A1* | 2/2010 | Jackson et al. | | 138/149 |

FOREIGN PATENT DOCUMENTS

| | | |
|---|---|---|
| AT | 43001 | 2/1987 |
| CH | 673694 A5 | 3/1990 |
| DE | 3307120 A1 | 9/1984 |
| DE | 8911934 U1 | 3/1990 |
| DE | 29615423 U1 | 4/1997 |
| DE | 20022368 U1 | 10/2001 |
| DE | 20303698 U1 | 6/2003 |
| DE | 102004046656 A1 | 4/2006 |
| EP | 0897788 B1 | 10/2001 |
| EP | 1371469 B1 | 5/2003 |
| GB | 2215427 A | 9/1989 |
| WO | 2004/029501 A1 | 4/2004 |

* cited by examiner

*Primary Examiner* — Patrick F Brinson
(74) *Attorney, Agent, or Firm* — Ware, Fressola, Van Der Sluys & Adolphson LLP

(57) ABSTRACT

A flexible heat-insulated conduit is described, made up of at least one medium-carrying internal tube, an external tube surrounding the at least one internal tube, and a heat-insulating layer based on polyurethane foam or polyisocyanurate foam and located between the at least one internal tube and the external tube, in which 0.1 to 7.5% by weight of hollow spheres are added into the foam, the hollow spheres comprising a casing made of a thermoplastic and being filled with a medium that brings about an inflation of the casing at an elevated temperature.

9 Claims, No Drawings

FLEXIBLE HEAT-INSULATED CONDUIT AND METHOD OF MAKING SAME

BACKGROUND OF THE INVENTION

1. Field of the Invention

The invention relates to a flexible heat-insulated conduit made up of at least one medium-carrying internal tube, an external tube surrounding the at least one internal tube, and a heat-insulating layer based on polyurethane foam or polyisocyanurate foam and located between the at least one internal tube and the external tube and to a method for manufacturing a heat-insulated conduit.

2. Description of the Background Art

EP 0 897 788 B1 discloses a heat-insulated conduit that comprises one or more internal tubes, a heat-insulating layer surrounding the internal tube or tubes, and a plastic external tube. In order to improve flexibility, the external tube is equipped with a slight corrugation. The heat-insulating layer is made of polyurethane foam that is made of a mixture of polyol and isocyanate, which is introduced into the gap between the internal tube or tubes and the external tube, and foams up therein.

The manufacture of polyurethane foam is the subject matter of EPÜ 1 371 469 B1. The mixture to be introduced into the gap is manufactured by delivering polyol, a propellant, and air to a static mixer, mixing them therein, and mixing this mixture with isocyanate in a dynamic mixer. The mixture manufactured in this fashion is introduced into the gap between the internal tube or tubes, where it foams up.

Although the corrugation of the external tube as well as all the materials, such as plastic, used for the internal tube or tubes and the external tube, make the conduit relatively flexible, the conduit is impossible to use in many cases.

The heat-insulated conduit manufactured in accordance with the documents described is utilized preferably as a house connector line for supplying district heat. It often happens in this context that the conduit must be curved around tight radii in order, for example, to get around structures, trees requiring protection, etc.

It is additionally desirable to wind the conduit onto drums having a small drum core diameter, and to transport it thereon to the installation site.

SUMMARY OF THE INVENTION

The underlying object of the present invention is therefore to improve the known conduit in terms of its bendability.

This object is achieved by a flexible heat-insulated conduit comprising:
(a) at least one medium-carrying internal tube;
(b) an external tube surrounding the at least one internal tube forming an annular gap therebetween; and
(c) a heat-insulating layer based on polyurethane foam or polyisocyanurate foam and located in the annular gap between the at least one internal tube and the external tube, wherein 0.1 to 7.5% by weight of hollow spheres are in the foam, the hollow spheres comprising a casing made of a thermoplastic and being filled with a medium that brings about an inflation of the casing at an elevated temperature.

Ideally, the proportion of hollow spheres is between 1 and 5% by weight.

In flexible conduit, the hollow spheres are present in an inflated state in the heat-insulating layer of the flexible conduit.

The method for manufacturing the flexible heat-insulated conduit of the present invention comprises the steps of:
(a) providing at least one medium-carrying internal tube with an external tube surrounding the at least one internal tube forming an annular gap therebetween;
(b) mixing components of a foam in a mixing chamber including 0.1 to 7.5% by weight of hollow spheres, each hollow sphere comprising a casing made of a thermoplastic and being filled with a medium that brings about an inflation of the casing at an elevated temperature; and
(c) introducing the mixture of components of the foam including the hollow spheres into the annular gap between the at least one internal tube and the external tube to create a heat-insulating layer.

The components of the foam include polyol, isocyanate and propellant, and the hollow spheres are added to either (1) the polyol, to the isocyanate or to the propellant or (2) the mixture of polyol, isocyanate and propellant in the mixing chamber.

The foam can be a polyurethane foam or a polyisocyanurate foam.

The hollow spheres inflate during formation of the heat-insulating layer.

The essential advantage of the invention may be seen in the fact that as a result of the hollow spheres that inflate because of the heat occurring in the foaming process, the finished foam becomes more elastic and the conduit consequently gains flexibility. The hollow spheres finely distributed in the polyurethane foam function as flexible buffer regions in the polyurethane structure, so that the polyurethane foam that is produced is more elastic and can yield upon external loading. The resulting decreased transverse rigidity of the conduit can be accepted because large traffic loads are not to be expected in the context of a house connector.

The flexible polyurethane foam allows a certain compression upon application of a force. This has a positive effect in terms of tube bending, in that the flexural strength of the conduit, in which the plastic internal tube, the polyurethane foam, and the plastic external tube form a composite, is decreased. The result is that upon bending of the conduit around tight radii, minimal or no breakages in the foam may be expected. Potential thermal bridges are thereby reduced, so that overall thermal insulation is improved.

The proportion of hollow spheres is advantageously 1 to 5% by weight.

The hollow spheres are present in the completed foam in the swollen state. During the foaming operation, heat is released and causes the plastic casing of the hollow spheres to soften; as a result, it can yield to the pressure increase produced in the interior of the hollow spheres, and their diameter increases.

The hollow spheres can be added to the polyol, to the isocyanate, to the propellant, or to the mixture of polyol, isocyanate, and propellant. What is essential in this context, however, is that an increase in temperature above the softening temperature of the casing of the hollow spheres not be reached until the foam material mixture has traveled into the gap between the internal and external tubes.

The medium present in the interior of the hollow spheres can exist in either the liquid or the gaseous state at any point in time. This depends only on the boiling temperature of the medium. All that is important is that inflation of the hollow spheres be enabled during the foaming-up operation directly before or after introduction of the foam into the gap.

DETAILED DESCRIPTION OF THE INVENTION

The invention is described in more detail with reference to the following exemplifying embodiments of the foam material mixture.

| | |
|---|---|
| 36 g | polyol |
| 70 g | isocyanate |
| 2.2 g | hollow spheres | are mixed with one another and foamed up freely in a beaker. $CO_2$ is used as a propellant.

In a second exemplifying embodiment,

| | |
|---|---|
| 50 g | polyol |
| 65.5 g | isocyanate |
| 2.3 g | cyclopentane (propellant) |
| 2.4 g | hollow spheres | were mixed with one another and foamed up freely in a beaker.

It was determined by a finger-pressure test that as compared with a reference sample of foam, manufactured with the same substances, that contained no hollow spheres, the foam according to the teaching of the invention was substantially more elastic and resilient than the previously known foam.

What is claimed is:

1. A flexible heat-insulated conduit comprising:
   (a) at least one medium-carrying internal tube;
   (b) an external tube surrounding the at least one internal tube forming an annular gap therebetween; and
   (c) a heat-insulating layer based on polyurethane foam or polyisocyanurate foam and located in the annular gap between the at least one internal tube and the external tube, wherein 0.1 to 5% by weight of hollow spheres are in the foam, the hollow spheres comprising a casing made of a thermoplastic and being filled with a medium that brings about an inflation of the casing at an elevated temperature, the hollow spheres are present in an inflated state in the heat-insulating layer of the flexible conduit.

2. A flexible heat-insulated conduit according to claim 1, wherein the proportion of hollow spheres is between 1 and 5% by weight.

3. A method for manufacturing a flexible heat-insulated conduit comprising the steps of:
   (a) providing at least one medium-carrying internal tube with an external tube surrounding the at least one internal tube forming an annular gap therebetween;
   (b) mixing components of a foam in a mixing chamber including 0.1 to 5% by weight of hollow spheres, each hollow sphere comprising a casing made of a thermoplastic and being filled with a medium that brings about an inflation of the casing at an elevated temperature; and
   (c) introducing the mixture of components of the foam into the annular gap between the at least one internal tube and the external tube to create a heat-insulating layer.

4. The method for manufacturing a flexible heat-insulated conduit according to claim 3, wherein the components of the foam include polyol, isocyanate and propellant, and the hollow spheres are added to the polyol, to the isocyanate or to the propellant.

5. The method for manufacturing a flexible heat-insulated conduit according to claim 3, wherein the components of the foam include polyol, isocyanate and propellant, and the hollow spheres are added the mixture of polyol, isocyanate and propellant in the mixing chamber.

6. The method for manufacturing a flexible heat-insulated conduit according to claim 3, wherein the foam is a polyurethane foam.

7. The method for manufacturing a flexible heat-insulated conduit according to claim 3, wherein the foam is a polyisocyanurate foam.

8. The method for manufacturing a flexible heat-insulated conduit according to claim 3, wherein the proportion of hollow spheres is between 1 and 5% by weight.

9. The method for manufacturing a flexible heat-insulated conduit according to claim 3, wherein the hollow spheres inflate during formation of the heat-insulating layer.

\* \* \* \* \*